United States Patent
Pryor

(10) Patent No.: US 7,603,102 B1
(45) Date of Patent: *Oct. 13, 2009

(54) BANDED BILLING SYSTEM FOR DATA COMMUNICATION SERVICE

(75) Inventor: Bruce A. Pryor, Shawnee Mission, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1284 days.

This patent is subject to a terminal disclaimer.

(21) Appl. No.: 10/881,435

(22) Filed: Jun. 29, 2004

Related U.S. Application Data

(63) Continuation-in-part of application No. 10/824,163, filed on Apr. 14, 2004, now Pat. No. 7,068,996.

(51) Int. Cl.
*H04M 11/00* (2006.01)

(52) U.S. Cl. ................ 455/406; 455/405; 455/407; 455/558; 705/40; 705/52; 705/77; 379/114.01; 379/132

(58) Field of Classification Search ........... 455/406, 455/405, 407, 558; 705/40, 52, 77–79; 379/114.01, 379/132
See application file for complete search history.

(56) References Cited

U.S. PATENT DOCUMENTS

| | | | |
|---|---|---|---|
| 4,538,030 A | | 8/1985 | Fossett et al. |
| 5,572,438 A * | | 11/1996 | Ehlers et al. ............... 700/295 |
| 5,649,117 A * | | 7/1997 | Landry ....................... 705/40 |
| 5,749,052 A * | | 5/1998 | Hidem et al. ............... 455/406 |
| 6,052,447 A | | 4/2000 | Golden et al. |
| 6,182,054 B1 | | 1/2001 | Dickinson et al. |
| 6,301,471 B1 | | 10/2001 | Dahm et al. |
| 6,327,466 B1 | | 12/2001 | Savolainen |
| 6,353,736 B1 | | 3/2002 | Hiromichi |
| 6,512,751 B1 | | 1/2003 | Struhsaker et al. |
| 6,556,917 B1 | | 4/2003 | Wawra et al. |
| 6,574,465 B2 | | 6/2003 | Marsh et al. |
| 6,597,903 B1 | | 7/2003 | Dahm et al. |
| 6,606,377 B2 | | 8/2003 | Ruckart et al. |
| 6,615,034 B1 | | 9/2003 | Alloune et al. |
| 6,941,272 B2 * | | 9/2005 | Dutta ......................... 705/14 |
| 6,947,723 B1 | | 9/2005 | Gurnani et al. |
| 7,167,699 B1 * | | 1/2007 | Kretsinger .................. 455/405 |
| 7,320,131 B1 * | | 1/2008 | O'Toole, Jr. ................ 718/104 |

(Continued)

OTHER PUBLICATIONS

Office Action from U.S. Appl. No. 10/824,163, dated Jan. 26, 2006.

(Continued)

*Primary Examiner*—Lester Kincaid
*Assistant Examiner*—Diego Herrera

(57) ABSTRACT

A banded billing system for data communication service is disclosed. A carrier's billing system maintains in data storage a banded-pricing schedule that divides a continuum of increments of data into a series of contiguous, mutually-exclusive increment-ranges and that specifies for each increment-range a respective cost. At the end of a billing period, the billing system determines a number of increments of data communicated by a given subscriber during the billing period. The billing system then queries the banded-pricing schedule to determine which increment-range the number of increments falls into, and to determine the cost specified by the banded-pricing schedule for that increment-range. The billing system then bills the determined cost to the subscriber, for data communication service in the billing period.

18 Claims, 4 Drawing Sheets

Banded-Pricing Schedule A

| Low | High | Monthly Cost |
|---|---|---|
| 0 | 5,000 | $10.00 |
| 5,001 | 5,500 | $10.75 |
| 5,501 | 6,000 | $11.50 |
| 6,001 | 6,500 | $12.25 |
| 6,501 | 7,000 | $13.00 |
| 7,001 | 7,500 | $13.75 |
| 7,501 | 8,000 | $14.50 |
| 8,001 | 8,500 | $15.25 |
| 8,501 | 9,000 | $16.00 |
| 9,001 | 9,500 | $16.75 |
| 9,501 | 10,000 | $17.50 |
| 10,001 | 10,500 | $18.25 |
| 10,501 | 11,000 | $19.00 |
| 11,001 | 11,500 | $19.75 |
| 11,501 | 12,000 | $20.50 |
| 12,001 | 13,000 | $21.25 |
| 13,001 | 14,000 | $22.00 |
| 14,001 | 15,000 | $22.75 |
| 15,001 | 16,000 | $23.50 |
| 16,001 | 17,000 | $24.25 |
| 17,001 | 18,000 | $25.00 |
| 18,001 | 19,000 | $25.75 |
| 19,001 | 20,000 | $26.50 |
| 20,001 | 21,000 | $27.25 |
| 21,001 | 22,000 | $28.00 |
| 22,001 | 23,000 | $28.75 |
| 23,001 | 24,000 | $29.50 |

U.S. PATENT DOCUMENTS

| | | | |
|---|---|---|---|
| 7,366,136 B1* | 4/2008 | Kalbag et al. | 370/329 |
| 7,450,927 B1* | 11/2008 | Creswell et al. | 455/405 |
| 7,453,996 B2* | 11/2008 | Jung | 379/114.01 |
| 7,486,944 B2* | 2/2009 | Carpenter et al. | 455/406 |
| 2001/0034704 A1* | 10/2001 | Farhat et al. | 705/39 |
| 2002/0173313 A1* | 11/2002 | Hutcheson et al. | 455/453 |
| 2002/0194077 A1* | 12/2002 | Dutta | 705/26 |
| 2003/0050044 A1* | 3/2003 | Awada et al. | 455/407 |
| 2003/0232614 A1* | 12/2003 | Squibbs | 455/405 |
| 2004/0009761 A1 | 1/2004 | Money et al. | |
| 2004/0009762 A1* | 1/2004 | Bugiu et al. | 455/406 |
| 2004/0043754 A1 | 3/2004 | Whewell | |
| 2004/0235451 A1 | 11/2004 | Whewell et al. | |
| 2005/0033691 A1 | 2/2005 | Whewell et al. | |
| 2005/0037731 A1 | 2/2005 | Whewell et al. | |
| 2005/0044018 A1 | 2/2005 | Whewell | |
| 2005/0065880 A1* | 3/2005 | Amato et al. | 705/40 |
| 2008/0274715 A1* | 11/2008 | Heit et al. | 455/406 |
| 2008/0287097 A1* | 11/2008 | Jiddou | 455/406 |

OTHER PUBLICATIONS eBucks, Press Clipping, "Sliding scale fee structure gives way to 'simple banded' fees," http://www.itweb.co.za/office/ebucks/clipping10.htm, printed from the World Wide Web on Jan. 21, 2004.

Nextel, Rate Plans, http://nextelonline.nextel.com/NASApp/onlinestore/Action/EnterZipCode, printed from the World Wide Web on Apr. 12, 2004.

Nextel, Flex Plans, http://nextelonline.nextel.com/phones_plans/flexplans_value_popup.html, printed from the World Wide Web on Apr. 12, 2004.

Nextel, Price Plan Details, http://nextelonline.nextel.com/NASApp/onlinestore/Action/RatePlanDetails?PLAN_ID=ARRI2501&zipCode=43085, printed from the World Wide Web on Apr. 12, 2004.

Call Center Plus, "Pricing," http://callcenterplus.com/pricing.html, printed from the World Wide Web on Jan. 21, 2004.

* cited by examiner

| Banded-Pricing Schedule A |||
|---|---|---|
| Low | High | Monthly Cost |
| 0 | 5,000 | $10.00 |
| 5,001 | 5,500 | $10.75 |
| 5,501 | 6,000 | $11.50 |
| 6,001 | 6,500 | $12.25 |
| 6,501 | 7,000 | $13.00 |
| 7,001 | 7,500 | $13.75 |
| 7,501 | 8,000 | $14.50 |
| 8,001 | 8,500 | $15.25 |
| 8,501 | 9,000 | $16.00 |
| 9,001 | 9,500 | $16.75 |
| 9,501 | 10,000 | $17.50 |
| 10,001 | 10,500 | $18.25 |
| 10,501 | 11,000 | $19.00 |
| 11,001 | 11,500 | $19.75 |
| 11,501 | 12,000 | $20.50 |
| 12,001 | 13,000 | $21.25 |
| 13,001 | 14,000 | $22.00 |
| 14,001 | 15,000 | $22.75 |
| 15,001 | 16,000 | $23.50 |
| 16,001 | 17,000 | $24.25 |
| 17,001 | 18,000 | $25.00 |
| 18,001 | 19,000 | $25.75 |
| 19,001 | 20,000 | $26.50 |
| 20,001 | 21,000 | $27.25 |
| 21,001 | 22,000 | $28.00 |
| 22,001 | 23,000 | $28.75 |
| 23,001 | 24,000 | $29.50 |

Fig. 2

| Banded-Pricing Schedule B |||
|---|---|---|
| Low | High | Monthly Cost |
| 0 | 5,000 | $10.00 |
| 5,001 | 5,500 | $11.00 |
| 5,501 | 6,000 | $12.00 |
| 6,001 | 6,500 | $13.00 |
| 6,501 | 7,000 | $14.00 |
| 7,001 | 7,500 | $15.00 |
| 7,501 | 8,000 | $16.00 |
| 8,001 | 8,500 | $17.00 |
| 8,501 | 9,000 | $18.00 |
| 9,001 | 9,500 | $19.00 |
| 9,501 | 10,000 | $20.00 |
| 10,001 | 10,500 | $21.00 |
| 10,501 | 11,000 | $22.00 |
| 11,001 | 11,500 | $23.00 |
| 11,501 | 12,000 | $24.00 |
| 12,001 | 12,500 | $24.50 |
| 12,501 | 13,000 | $25.00 |
| 13,001 | 13,500 | $25.50 |
| 13,501 | 14,000 | $26.00 |
| 14,001 | 14,500 | $26.50 |
| 14,501 | 15,000 | $27.00 |
| 15,001 | 15,500 | $27.50 |
| 15,501 | 16,000 | $28.00 |
| 16,001 | 16,500 | $28.50 |
| 16,501 | 17,000 | $29.00 |
| 17,001 | 17,500 | $29.50 |
| 17,501 | 18,000 | $30.00 |

Fig. 3

BANDED BILLING SYSTEM FOR DATA COMMUNICATION SERVICE

REFERENCE TO RELATED APPLICATION

The is a continuation-in-part of U.S. patent application Ser. No. 10/824,163, entitled "Banded Billing System for Telecommunication Service," filed on Apr. 14, 2004, the entirety of which is hereby incorporated herein by reference.

BACKGROUND

1. Field of the Invention

The present invention relates to data communication service and, more particularly, to billing of subscribers for such service.

2. Description of Related Art

In the existing art, when a user signs up for data communication service, the service provider may provide the user with a palette of service plans from which to chose. One such service plan might allow the user to engage in an unlimited quantity of data communication for a fixed monthly recurring charge (MRC). Other service plans might provide different MRCs for different quantities of data, plus a per-unit charge for communication of data beyond the quantity allotted. For instance, one plan might allow the user to communicate up to 5 megabytes of data per month for an MRC of $5.00 with a charge of $0.08 for each additional kilobyte, another plan might allow the user to communicate up to 10 megabytes of data per month for an MRC of $10.00 with a charge of $0.07 for each additional kilobyte, and another plan might allow the user to communicate up to 30 megabytes of data per month for an MRC of $20.00 with a charge of $0.06 for each additional kilobyte. Still another service plan might allow a user to engage in an unlimited quantity of data communication for a per-unit charge, such as a charge of $0.10 per kilobyte of data communicated.

These sorts of service plans tend to work well for users who can manage their quantity of data communication well. That is, a user who can accurately predict the quantity of data that he or she will communicate per month can sensibly select a service plan that provides that quantity of data per month, for a known monthly charge.

Unfortunately, however, the same cannot be said for users who do not manage their quantity of data communication well. If a user cannot accurately predict the quantity of data that he or she will communicate per month, the user is likely to either under-subscribe or over-subscribe, and to thereby incur additional expense that is out of proportion with the user's actual use.

For instance, to avoid going over the base quantity of data allotted per month, a user might sign up for a plan that allows for much more data per month than the user is ever likely to communicate. However, such a plan would likely cost a user more than the user thinks, since the user would be paying for communication of more data than the user actually communicates. Alternatively, to avoid paying for more data communication in this way, the user might instead sign up for a plan that allows for less data per month than the user is likely to communicate. The end result of this alternative approach, however, would be that the user would pay more per month in additional charges per unit of data for data communicated beyond the maximum allotted.

Still further, if a user selects a service plan that allows the user to engage in an unlimited quantity of data communication for a fixed MRC or for a per-unit charge, the user may also pay more than the user could otherwise pay, since the service provider is likely to set the MRC or per-unit charge for such a plan to be high enough to cover users who engage in substantial data communication.

SUMMARY

The present invention provides an improved method and system for billing subscribers for data telecommunication service. According to the invention, a service provider will maintain a banded pricing schedule that designates monthly charges corresponding with varying ranges (or "bands") of use per month. Each month, the service provider will then determine how many increments of data a subscriber actually communicated (sent and/or received) and will refer to the banded pricing schedule to determine which range that number of increments falls into and to identify a monthly charge for that range. The service provider will then apply that charge to the subscriber's account.

Advantageously, this banded billing arrangement thus functions as a type of insurance policy for subscribers, to safeguard against over-subscriptions and under-subscriptions. More particularly, the arrangement allows a subscriber's monthly charge to fluctuate from month to month in a manner that corresponds with the quantity of data the subscriber actually communicates per month. If a subscriber communicates many increments of data in a given month, then the service provider will match the usage to a higher increment-range of the banded pricing schedule, and so the service provider will charge the subscriber a higher monthly fee for that month. Yet, if the subscriber communicates fewer increments of data in a given month, then the service provider will match the usage to a lower increment-range from the banded pricing schedule, and so the service provider will charge the subscriber a lower monthly fee for that month.

Consequently, the invention reduces or eliminates the need for a subscriber to guess how much data he or she will communicate per month when signing up for a monthly service plan. Rather, the subscriber can simply sign up for the banded pricing plan and then be billed per month based on the increment-range in which the subscriber's actual usage falls in the month.

These as well as other aspects and advantages will become apparent to those of ordinary skill in the art by reading the following detailed description, with reference where appropriate to the accompanying drawings.

BRIEF DESCRIPTION OF THE DRAWINGS

FIGS. 2 and 3 are sample banded-pricing schedules.

DETAILED DESCRIPTION OF AN EXEMPLARY EMBODIMENT

Figure 1:
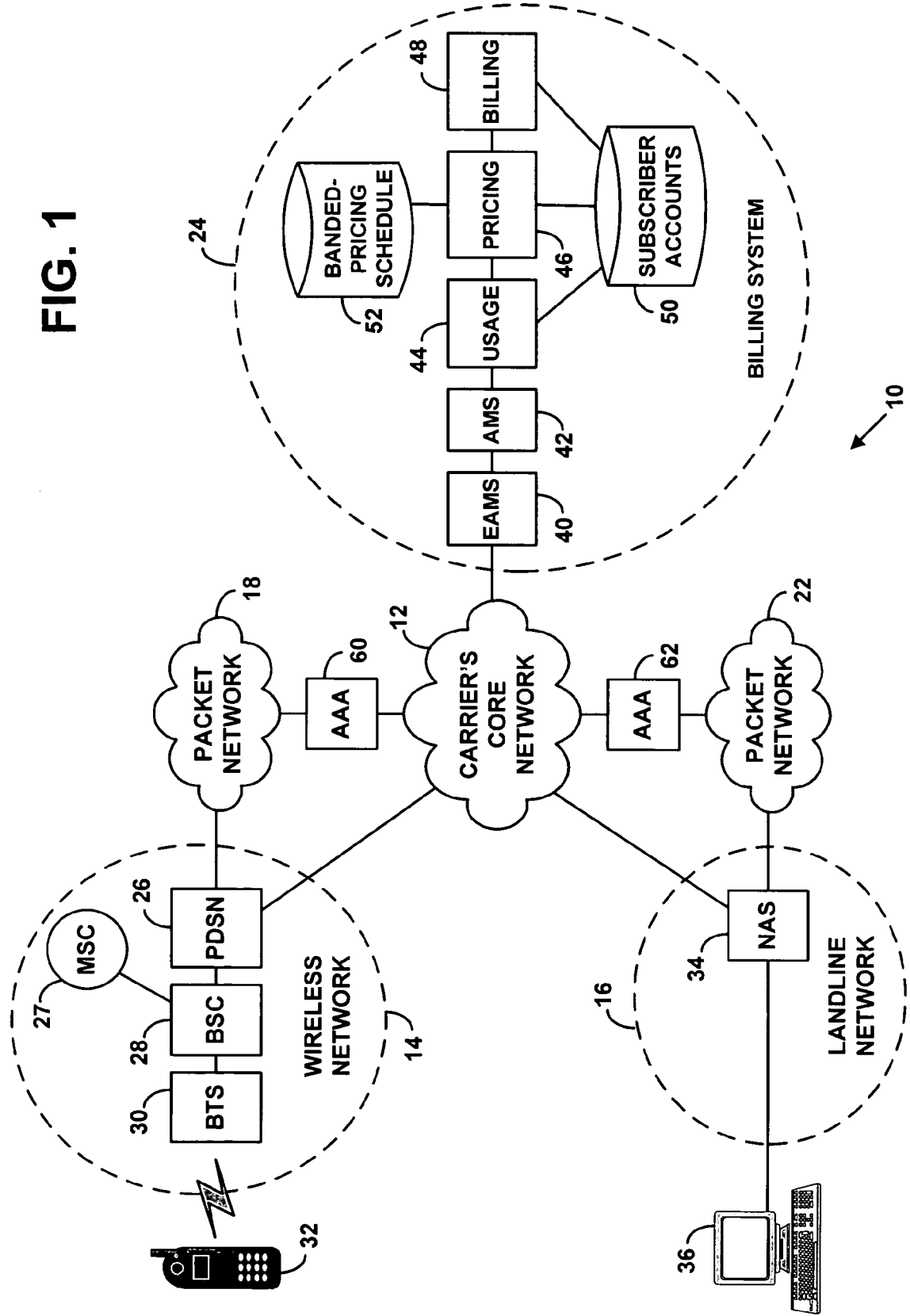
FIG. 1 is a block diagram of a telecommunication network in which an embodiment of the invention can be carried out.

The present invention can be carried out by a telecommunication service provider (carrier) or other entity, in order to charge subscribers for use of telecommunication service in a given period of time, such as monthly, bimonthly or quarterly, for instance. FIG. 1 depicts an example telecommunication network 10 that could be owned and operated by a service provider in order to provide telecommunication service and to carry out the banded billing functions of the invention.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Example network 10 of FIG. 1 includes a carrier's core network 12, such as an ATM and/or IP-based network. Connected with the core network 12 is then one or more access networks/systems, such as a wireless access network 14 and a landline access network 16, each of which may allow subscribers to engage in data telecommunication services such as web browsing, voice-over-IP, e-mail communication, or others. Each of the access networks is coupled, in turn, with one or more data transport networks 18, 22, which could be the public Internet or could be private packet-switched networks operated by the carrier (e.g., integrated with core network 12).

Also connected with the core network 12 is a billing system 24, which preferably carries out the banded billing functions, as will be described in detail below. In addition, sitting on the core network are one or more authentication, authorization and accounting (AAA) servers 60, 62, which may function to pass usage information to the billing system to facilitate billing, as will also be described more below.

Each of the access networks shown by way of example in FIG. 1 includes a gateway or analogous entity that functions to provide connectivity between subscriber stations and transport networks, such as networks 18, 22. For instance, the wireless access network 14 includes a packet data serving node (PDSN) 26, which, together with a base station controller (BSC) 28 and base transceiver station (BTS) 30, provides connectivity between one or more wireless subscriber stations (e.g., wireless communication device (WCD) 32) and one or more transport networks. And the landline access network 16 includes a network access server (NAS) 34, which provides connectivity between one or more landline subscriber stations (e.g., personal computer 36) and one or more transport networks.

Wireless access network 14 may, more specifically, take the form of a cellular radio access network. Typically in such a network, one or more BTSs 30 would radiate to define one or more wireless coverage areas, such as cells and cell sectors, in which WCDs can operate. One or more BSCs 32 would then control air interface communications between the BTSs and the WCDs, such as to assign air interface traffic channels and facilitate handoff of communications between wireless coverage areas. In turn, one or more one or more mobile switching centers (MSCs) 27 may control one or more BSCs and provide connectivity with one or more transport networks such as the public switched telephone network (PSTN). Such a wireless access network could employ various types of air interface protocols, such as AMPS, TDMA, CDMA, GSM, 802.11, or other protocols now known or later developed.

Although FIG. 1 depicts in wireless access network a single PDSN, a single MSC, a single BSC and a single BTS, it should be understood that more than one of each might exist. Further, in some implementations, these components could be integrated together in various combinations. For instance, often the functions of the BSC and MSC are integrated into a single platform, which may or may not be co-located or integrated with a BTS. Still further, note that wireless access network 14 could take various other forms as well.

Landline access network 16, on the other hand, may comprise a local area network, such as an enterprise network, a packet-cable distribution system, a cable modem distribution system, a digital subscriber line (DSL) distribution system, or the like, which provides connectivity between landline subscriber stations and network access server 34. Alternatively, landline access network 16 may comprise a landline telephone system that provides dial-up connectivity between landline subscriber stations and NAS 34. Although NAS is shown between landline subscriber station 36 and transport network 22, NAS 34 could equally reside on transport network 22 so that communication between the subscriber station and the NAS traverses the transport network. Still other arrangements are possible as well.

In practice, a gateway such as PDSN 26 or NAS 34 may receive requests from subscriber stations to engage in data communication, may responsively grant those requests, and data communication to and from the subscriber stations may then pass through the gateway. For example, in the wireless access network 14, PDSN 26 may receive an origination message provided from WCD 32 (via BTS 30 and BSC 28), seeking to establish packet-data connectivity. In response, PDSN 26 may negotiate with the WCD 32 to establish a data-link layer connection and may assign an IP address for the WCD 32 to use in communications on the transport network 18. Packet data communications to and from the WCD 32 may then flow through the PDSN 26.

Similarly, in the landline access network 16, NAS 34 may receive a request from personal computer 36 to establish connectivity with packet-data network, and NAS 34 may establish a data-link layer connection with the computer 36 and assign an IP address for the computer 36 to use in communications on transport network 22. Packet data communications to and from the computer 36 may then flow through the NAS 26.

Although not shown in FIG. 1, note that other gateways or similar entities may be present in the telecommunication network 10 as well. For instance, other access networks may be coupled by respective gateways with transport networks. Or data communications may be made to pass through one or more other gateways or similar entities on one or more other transport networks or elsewhere.

Conventionally, a gateway (such as a PDSN or NAS, for instance) will also track and report subscriber usage, to facilitate billing and performance monitoring. To do so, for each data session that passes through the gateway, the gateway may generate and send Usage Data Records (UDRs) to a designated AAA server. More particularly, at the start of the session, the gateway may send a START UDR, at the end of the session, the gateway may send a STOP UDR, and periodically during the session, the gateway may send other UDRs. Each UDR may be compliant with the RADIUS (Remote Authentication Dial In User Service) protocol and may provide information such as a session ID, a subscriber ID, the subscriber's assigned IP address, and the number of bytes of data communicated so far during the session. Each UDR is typically formatted as a database record with predefined fields.

A gateway may be programmed to record data quantities in each UDR with various increments and with a desired level of accuracy. For instance, a gateway could be programmed to record the quantity of data communicated as a number of bytes or a number of kilobytes. As another example, a gateway could be programmed to round data quantity to the nearest whole byte or kilobyte and to record that whole increment count in the UDR. Further, a gateway may be programmed to record a special data quantity for particular sessions. For instance, a gateway could be programmed to record a quantity of zero increments of data for sessions of a certain type, such as data sessions between one of the carrier's subscriber's and the carrier's customer service system or between a subscriber and one or more other designated network entities, or for sessions that experienced system disconnects. Other examples are possible as well.

Typically each gateway will be programmed to send its UDRs to a particular AAA server. To serve geographically dispersed gateways, a carrier may thus provide numerous AAA servers, each of which may collect UDRs from various gateways.

Periodically, or in response to a triggering event (such as receipt of each UDR, or receipt of a request from the billing system 24), each AAA server may programmatically send to the billing system 24 the UDRs that it has received. Based on the UDRs, subscriber service plans, and perhaps other data, the billing system 24 will then compute and apply charges to subscriber accounts. On a recurring basis, such as every month, every other month, or quarterly, for instance, the billing system may then generate subscriber invoices and send the invoices to subscribers for payment.

Billing system 24 can take various forms. In a preferred embodiment, for instance, the billing system 24 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors), and all of which could reside on a local area network or could be connected together in some other way. As shown by way of example in FIG. 1, the subsystems may include an Enhanced Accounting Management System (EAMS) 40, an Accounting Mediation System (AMS) 42, an usage subsystem 44, a pricing subsystem 46, and a billing subsystem 48. Further, the billing system 24 may include a subscriber account store 50 to hold subscriber accounts, such as records of usage and service plan and payment information.

The EAMS 40 may function to aggregate UDRs from multiple AAA servers, on a session-by-session basis. This can be important in a mobile communication system, where subscriber stations move from access network to access network during the course of a given session, since in that case multiple AAA servers may provide UDRs for a common session. For each session, the EAMS 40 may periodically generate and send to the AMS 42 an IP Data Record (IPDR), which specifies a session ID, a subscriber ID, and the quantity of data communicated so far in the session.

The AMS 42 in turn may function to aggregate IPDRs that it receives from the EAMS 40. For instance, for each session, the AMS 42 may periodically generate and send to the usage subsystem 44 an incremental IPDR that specifies a session ID, a subscriber ID, and the quantity of data communicated since the last IPDR that the AMS 42 sent to the usage subsystem 44 for the session.

Upon receipt of each IPDR from the AMS 42, the usage subsystem 44 may determine from the IPDR the quantity of data communicated so far in the session. The usage subsystem may then record that data quantity into the appropriate subscriber account record in account store 50.

Given an IPDR, the usage subsystem 44 could be arranged to determine quantity of data communication in various ways, possibly depending on the type of information provided in the IPDR and upon one or more other factors. For instance, the usage subsystem 44 could consider the data quantity indicated by the IPDR to be the quantity of data communicated. Alternatively, the usage subsystem 44 could manipulate the data quantity indicated by the IPDR in some way, such as by rounding the indicated data quantity in a final IPDR for a session to the nearest whole increment of bytes, kilobytes, or other unit of measure (thus effectively treating any partial increment as a whole increment.) Further, the usage subsystem 44 may refer to subscriber profile records (which might be stored in account store 50 or elsewhere) to determine if special data quantity adjustments should be made for particular subscribers or for particular types of sessions. Still further, the usage subsystem 44 might perform different data quantity adjustments depending on time, day, date, or other factors.

As the usage subsystem 44 records the quantity of data communicated for a given session into the appropriate record in account store 50, the usage subsystem 44 may update a total number of increments of data communicated for that account during the current billing period (e.g., month, quarter, etc.) Alternatively, the usage subsystem 44 may simply record in the subscriber account an indication of the total number of increments together per session.

At the end of the billing period for the subscriber or at another designated time, the pricing subsystem 46 will next apply a banded-billing process so as to determine a charge for the increments of data communicated by the subscriber (e.g., to and/or from the subscriber) during the billing period. Note that, for a given subscriber account, the pricing subsystem 42 could perform this function separately for different categories of data sessions, such as for wireless, landline, voice-over-IP, web browsing, or other sorts of sessions, and the pricing subsystem 46 could produce separate charges for each category of sessions. Alternatively, the pricing subsystem 46 could perform this function cumulatively for all types of sessions, thus producing a cumulative charge to the subscriber.

In order to carry out the banded-billing process, the billing system will preferably maintain in data storage a banded-pricing schedule 50, which specifies increment-ranges and respective costs. More particularly, the banded-pricing schedule 50 will preferably take the form of a stored table that divides a continuum of increments of data into a series of contiguous, mutually-exclusive increment-ranges and that specifies for each increment-range a respective cost. The increments can be bits, bytes, words, kilobytes, megabytes, packets, cells, or other units of data.

Preferably, the continuum of increments of data will start at a low end of zero increments and extend to a designated high end. For instance, the continuum may extend from zero kilobytes to 18,000 kilobytes. Further, each of a plurality of the increment-ranges listed in the table (e.g., every increment-range) will preferably span multiple increments, such as 500 or 1,000 kilobytes for instance. Yet further, the various increment-ranges in the table can be the same size as each other or can vary in size from each other.

FIGS. 2 and 3 illustrate some example banded-pricing schedules, although it should be understood that other examples are possible as well. Each table is structured with three columns and multiple rows, with each row identifying a particular increment-range and specifying a respective monthly cost for the increment-range. More particularly, for each increment-range, the first and second columns set forth the upper and lower limits of the increment-range and the third column sets forth the cost for use that falls within those limits.

The banded-pricing schedule of FIG. 2 begins with a lowest range of 0 to 5,000 kilobytes, then continues with 500-kilobyte ranges through 11,500 kilobytes, and then continues with 1,000-kilobyte ranges through 24,000 kilobytes. For the first kilobyte-range, the schedule assigns a cost of $10.00, and for each subsequent kilobyte-range, the schedule increases the monthly cost by $0.75.

Algorithmically, this schedule is an example of one that has a first increment-range of 0 to P increments, that then continues with N increment-ranges $R_k$ each extending from $\{P+(k-1)(Q)+1\}$ increments to $\{P+(k)(Q)\}$ increments, and that then continues with M increment-ranges $R_j$ each extending from $\{P+(N)(Q)+(j-1)(T)+1\}$ increments to $\{P+(N)(Q)+(j)(T)\}$ increments, where k=1, 2, 3, ..., N, where j=1, 2, 3, ..., M, where Q is a number of increments, and where T is a number of increments greater than Q. More particularly, in this schedule, P=5,000 kilobytes, Q=500 kilobytes, T=1,000 kilobytes, N=14, and M=12.

Further, the cost that this schedule sets forth for the first increment-range could be represented as a value C, with the cost for the next N subsequent increment-ranges $R_k$ being represented as a value C+(k)(G), and with the cost for the following M increment-ranges $R_j$ being represented as a value C+(N)(G)+(j)(G), where G is an incremental cost. More particularly, in this schedule, C=$10.00 and G=$0.75.

The banded-pricing schedule of FIG. 3, on the other hand, begins with a lowest range of 0 to 5,000 kilobytes, then continues with 500-kilobyte ranges through a high end of 18,000 kilobytes. For the first kilobyte-range, the schedule assigns a cost of $10.00, for each kilobyte-range through the 11,501:12,000 range, the schedule increases the monthly cost by $1.00, and for each subsequent kilobyte-range, the schedule increases the monthly cost by just $0.50.

Algorithmically, this second schedule is an example of one that has a first increment-range of 0 to P increments, that then continues with N increment-ranges $R_k$ each extending from $\{P+(k-1)(Q)+1\}$ increments to $\{P+(k)(Q)\}$ increments, and that then continues with M increment-ranges $R_j$ each extending from $\{P+(N)(Q)+(j-1)(Q)+1\}$ increments to $\{P+(N)(Q)+(j)(Q)\}$ increments, where k=1, 2, 3, ..., N, where j=1, 2, 3, ..., M, and where Q is a number of increments. More particularly, in this schedule, P=5,000 kilobytes, Q=500 kilobytes, N=14, and M=12.

Further, the cost that the schedule of FIG. 3 sets forth for the first increment-range could be represented as a value C, with the cost for the next N subsequent increment-ranges $R_k$ being represented as a value C+(k)(G), and with the cost for the following M increment ranges $R_j$ being represented as a value C+(N)(H)+(j)(H), where G is an incremental cost, and where H is an incremental cost less than G. More particularly, in this schedule, C=$10.00, G=$1.00, and H=$0.50 (i.e., H is half of G).

Although the examples shown in FIGS. 2 and 3 provide for variation in the incremental cost increase per increment-range after a certain number of increment-ranges or variation in the size of increment-ranges after a certain number of increment-ranges, it is possible that all of the increment-ranges could be the same size and/or that all of the increment-ranges could provide for the same incremental cost increase.

Further, other variations in the structure of the banded-pricing schedule are possible as well. For instance, after a first number of increment-ranges, the size of the increment-ranges might decrease, and after a second number of increment-ranges, the size of the increment-ranges might decrease further. As another example, after a first number of increment-ranges, the incremental cost increase per increment-range might decrease, and after a second number of increment-ranges, the incremental cost increase per increment-range might decrease further. And as yet another example, the lowest increment-range could span the same number of increments as each of the other increment-ranges.

As shown in FIG. 1, the banded-pricing schedule can be stored in a database 52 external to the pricing subsystem 46, such as in a file server that is part of the billing system 24.

Alternatively, the banded-pricing schedule could be stored in data storage (e.g., ROM or hard disk storage) of the pricing subsystem 46. Further, backup copies could be provided for redundancy.

To apply the banded-billing process, the pricing subsystem 46 will determine how many increments of data a given subscriber communicated (e.g., sent and/or received) in a billing period (such as a monthly or quarterly) and will then query the banded-pricing schedule 50 to determine (i) which increment-range the number of increments falls into and (ii) the specified cost for that increment-range. The pricing subsystem 42 will then record that cost as a charge in the subscriber's account record.

The pricing subsystem 42 can be arranged to determine the number of increments used by the subscriber in the billing period in various ways. For instance, if the usage subsystem 44 has already provided a total number of increments of use in the subscriber account record, then the pricing subsystem 46 can determine the number of increments by reading that total from the account record. As another example, the pricing subsystem 46 can itself total up the subscriber's increments of use for the billing period, based on the usage that the per-session (or other) usage that subsystem 44 recorded in the account record. The pricing subsystem 46 can further apply special rules in determining how many increments of data the subscriber communicated in the period. For instance, the pricing subsystem 46 could disregard increments of data communicated for particular types of sessions or for other reasons, or the pricing subsystem 46 could provide various promotional discounts or other adjustments.

The total number of increments of data that the pricing subsystem 46 (or other aspects of billing system 24 or network 10) determines a subscriber communicated in a given billing period does not need to be an exact representation of the quantity of data actually communicated by the subscriber in that period, although it is preferably a very close approximation. For instance, as noted above, the determination could involve rounding of increments or making other adjustments of the number of increments. The end result, in any event, is a determination of number of increments used.

Once the pricing subsystem 46 has determined the number of increments of use for the given subscriber during the billing period, the pricing subsystem 42 then queries the banded-pricing schedule 50 to determine which increment-range the number of increments falls into and to determine the price that the schedule specifies for that increment-range.

By way of example, referring to the banded-pricing schedule of FIG. 2, if the subscriber communicated 12,662 kilobytes of data in the billing period, then the pricing subsystem 46 will determine that the subscriber's use falls into the increment-range of 12,001:13,000 and that the specified cost for that increment-range is $21.25. Alternatively, if the subscriber communicated 19,045 kilobytes of data in the billing period, then the pricing subsystem 46 will determine that the use falls into the increment-range of 19,001:20,000 and that the specified cost for that increment-range is $26.50. Still alternatively, if the subscriber communicated 6,590 kilobytes of data in the billing period, then the pricing subsystem 46 will determine that the use falls into the increment-range of 6,501:7,000 and that the specified cost for that increment-range is $13.00.

The pricing subsystem 46 will then store in the subscriber's account record an indication of the determined cost for billing period. Further, the pricing subsystem 46 may record other charges to the subscriber's account, such as taxes, fees and surcharges that might be prescribed by law, and may apply various discounts to the determined cost.

In turn, the billing subsystem 48 may then produce an invoice to send to the subscriber for the billing period. For instance, the billing subsystem 44 may produce an invoice that lists the number of increments of data communicated per session during the billing period, a total number of increments of data determined to have been communicated during the billing period, a determined cost for that data communication, and any adjustments to the total. The billing subsystem 48 may then send the invoice to the subscriber, by postal mail, e-mail or in some other manner.

Figure 4:
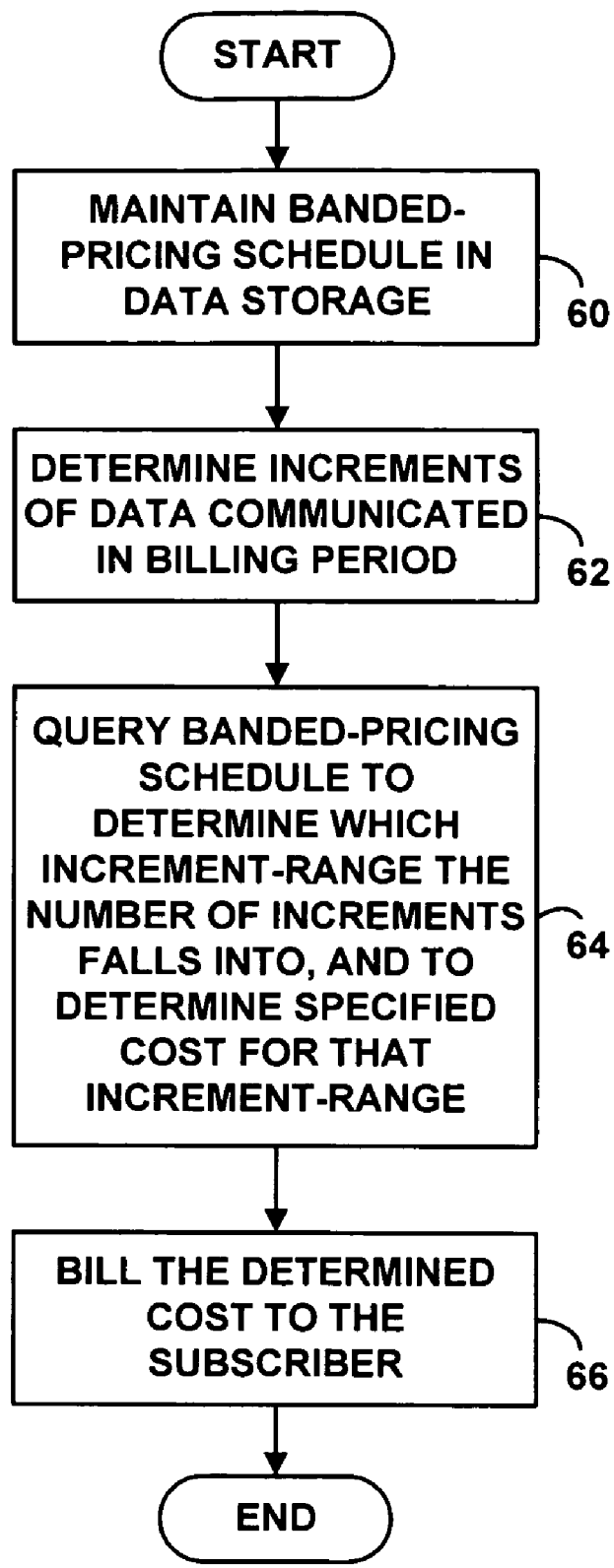
FIG. 4 is a flow chart depicting functions that can be carried out in accordance with an embodiment of the invention.

FIG. 4 is a flow chart summarizing functions of the banded-billing system as described above. As shown in FIG. 4, at block 60, the billing system 24 maintains in data storage a banded-pricing schedule that divides a continuum of increments of data into a series of contiguous, mutually-exclusive increment-ranges and that specifies for each increment-range a respective cost. At block 62, the billing system 24 determines a number of increments of data communicated by a given subscriber during a given period. At block 64, the billing system 24 the queries the banded-pricing schedule to determine which increment-range the number of increments falls into, and to determine the cost specified by the banded-pricing schedule for that increment-range. In turn, at block 66, the billing system 24 bills the determined cost to the given subscriber, for use of the telecommunication service during the given period. (This billing function could comprise recording the determined cost (or some variant thereof) in the subscriber's account record, and it could further comprise sending an invoice to the subscriber to request payment.)

An exemplary embodiment of the present invention has been described above. Those skilled in the art will understand, however, that changes and modifications may be made to the embodiment described without departing from the true scope and spirit of the invention, which is defined by the claims.

What is claimed is:

1. A banded billing method for data communication services comprising:
    maintaining in data storage a banded-pricing schedule that divides a continuum of increments of data into a series of contiguous, mutually-exclusive increment-ranges and that specifies for each increment-range a respective cost;
    determining a number of increments of data communicated by a given subscriber during a given period;
    querying the banded-pricing schedule to determine which increment-range the number of increments falls into, and to determine the cost specified by the banded-pricing schedule for that increment-range; and
    billing the determined cost to the given subscriber, for data communication service during the given period
    wherein the series of increment-ranges begins with a first increment-range of 0 to P increments, and then continues with increment-ranges $R_k$, each extending from $\{P+(k-1)(Q)+1\}$ increments to $\{P+(k)(Q)\}$ increments, wherein $k=1, 2, 3, \ldots, N$, and wherein Q is a number of increments.

2. The banded billing method of claim 1, wherein each of a plurality of the increment-ranges defined by the banded-pricing schedule spans a plurality of increments.

3. The banded billing method of claim 1, wherein each of the increment-ranges defined by the banded pricing schedule spans a plurality of increments.

4. The banded billing method of claim 1, wherein P=5,000 kilobytes, and wherein Q=500 kilobytes.

5. The banded billing method of claim 4, wherein N=14.

6. The banded billing method of claim 1, wherein:
    the cost that the banded-pricing schedule specifies for the first increment-range is C, and
    the cost that the banded-pricing schedule specifies for each subsequent increment-range $R_k$ is $C+(k)(G)$, wherein G is an incremental cost.

7. The banded billing method of claim 1, wherein, after N increment-ranges following the first increment-range, the series of increment-ranges continues with increment-ranges $R_j$, each extending from $\{P+(N)(Q)+(j-1)(T)+1\}$ increments to $\{P+(N)(Q)+(j)(T)\}$ increments, wherein $j=1, 2, 3, \ldots, M$, and wherein T is a number of increments greater than Q.

8. The banded billing method of claim 7, wherein:
    the cost that the banded-pricing schedule specifies for the first increment-range is C,
    the cost that the banded-pricing schedule specifies for each subsequent increment-range $R_k$ is $C+(k)(G)$, wherein G is an incremental cost, and
    the cost that the banded-pricing schedule specifies for each subsequent increment-range $R_j$ is $C+(N)(G)+(j)(G)$.

9. The banded billing method of claim 1, wherein, after N increment-ranges following the first increment-range, the series of increment-ranges continues with increment-ranges $R_j$, each extending from $\{P+(N)(Q)+(j-1)(Q)+1\}$ increments to $\{P+(N)(Q)+(j)(Q)\}$ increments, wherein $j=1, 2, 3, \ldots, M$, and wherein:
    the cost that the banded-pricing schedule specifies for the first increment-range is C,
    the cost that the banded-pricing schedule specifies for each subsequent increment-range $R_k$ is $C+(k)(G)$, wherein G is an incremental cost, and
    the cost that the banded-pricing schedule specifies for each subsequent increment-range $R_j$ is $C+(N)(H)+(j)(H)$, wherein H is an incremental cost less than G.

10. The banded billing method of claim 9, wherein H is half of G.

11. The banded billing method of claim 1, wherein the data communicated by the given subscriber comprises voice-over-IP data.

12. The banded billing method of claim 1, wherein the data communicated by the given subscriber comprises data communicated by the given subscriber via a wireless access network.

13. The banded billing method of claim 1, wherein the data communicated by the given subscriber comprises data communicated by the given subscriber via a landline access network.

14. The banded billing method of claim 1, wherein determining the number of increments of data communicated by the given subscriber in the given period comprises extracting usage data from usage records generated by one or more gateways.

15. The banded billing method of claim 1, wherein the given period is a month.

16. The banded billing method of claim 1, further comprising:
    rounding at least one increment of data when determining the number of increments.

17. The banded billing method of claim 1, wherein billing the determined cost to the subscriber comprises recording the cost in a subscriber account record.

18. The banded billing method of claim 1, wherein billing the determined cost to the given subscriber comprises generating and sending to the given subscriber an invoice indicating the determined cost.

* * * * *

UNITED STATES PATENT AND TRADEMARK OFFICE
CERTIFICATE OF CORRECTION

| | | |
|---|---|---|
| PATENT NO. | : 7,603,102 B1 | Page 1 of 1 |
| APPLICATION NO. | : 10/881435 | |
| DATED | : October 13, 2009 | |
| INVENTOR(S) | : Bruce A. Pryor | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1506 days.

Signed and Sealed this

Fifth Day of October, 2010

David J. Kappos
*Director of the United States Patent and Trademark Office*